United States Patent

[11] 3,600,801

| [72] | Inventors | Walter N. Larsen<br>Erie;<br>Kenneth R. Reynolds, Lawrence Park, both of, Pa. |
|---|---|---|
| [21] | Appl No | 815,993 |
| [22] | Filed | Apr. 14, 1969 |
| [45] | Patented | Aug. 24, 1971 |
| [73] | Assignee | General Electric Company |

[54] METHOD OF MANUFACTURING AN ELECTRIC COIL
6 Claims, 2 Drawing Figs.

[52] U.S. Cl. ........................... 29/605, 29/596, 310/42, 310/43, 310/45, 310/208
[51] Int. Cl. ........................... H01f 7/06
[50] Field of Search. ........................... 156/48; 29/596, 598, 605; 310/208, 42, 43, 45; 264/342

[56] References Cited
UNITED STATES PATENTS

| 2,400,008 | 5/1946 | Korte | 29/605 |
| 2,763,798 | 9/1956 | Kriss et al. | 310/208 |
| 2,836,744 | 5/1958 | Clawson | 310/208 |
| 3,048,651 | 8/1962 | Howard et al. | 156/48 X |
| 3,436,815 | 4/1969 | Sheets | 29/596 X |

Primary Examiner—John F. Campbell
Assistant Examiner—Carl E. Hall
Attorneys—James C. Davis, Jr., Edward W. Goebel, Jr., Joseph B. Forman, Frank L Neuhauser and Oscar B. Waddell ABSTRACT: An electric coil which is permeated with an insulating liquid varnish is manufactured by first winding a plurality of turns of insulated magnet wire about a form and then wrapping heat-shrinkable tape spirally around the resulting coil such that space is left between adjacent turns of the tape. Liquid-insulating varnish is then applied to the wrapped coil in an amount which can eventually permeate the coil. The varnished, wrapped coil is then heated to cause the wrapping material to shrink and compress the heretofore loose coil so that the varnish fills the voids between adjacent turns of the coil as it is being at least partially cured.

PATENTED AUG 24 1971 3,600,801

INVENTORS
WALTER N. LARSEN
KENNETH R. REYNOLDS
BY
Edward R Goebel
THEIR ATTORNEY

METHOD OF MANUFACTURING AN ELECTRIC COIL

BACKGROUND OF THE INVENTION

This invention relates to the insulation of electric members, and more specifically to a method of insulating electric coils of the type used for dynamoelectric machines or for other types of electromagnetic devices such as transformers, solenoids, etc.

Rotatable dynamoelectric machines comprise a rotor encircled by a stator with magnetic fields generated by each of these members. In a motor the interaction of the magnetic fields produced by the rotor and the stator causes the rotor to rotate and produce mechanical output energy. Magnetic-field-producing members of the stator, for example, of the dynamoelectric machine may comprise one or more salient pole pieces of magnetizable material such as steel each having an electric coil wound thereabout so that the magnetic flux needed for the operation of the dynamoelectric machine is produced when an electric current is caused to flow in the coil. The coil itself comprises a plurality of turns of wire, this wire having been covered with an electrically insulating coating such as an insulating enamel to provide electrical isolation between adjacent turns of the coil. Wire of this type is commonly referred to as magnet wire.

Magnet wire having insulating enamel coating which is capable of withstanding continued operating temperatures of at least 135° C. has been available and has been widely used in making coils for dynamoelectric machines. This high temperature insulation has allowed higher current densities to be used for the coils so that the power output of the machines can be appreciably increased without breaking down the insulation between adjacent turns of magnet wire.

It is well known that current passing through the magnet wire of coils causes heat to be generated in the coils, and the amount of heat generated in the coils increases as the current level of the coils increases. This heat must be conducted to the surfaces of the coils to allow the coils to be cooled, either by convection cooling within the machine or by conducting heat through the pole and the frame of the dynamoelectric machine which act as heat sinks which pass the heat to air external of the machine. For this reason, the electrically insulating enamel of the magnet wire must be thermally conducting as well. Experience has shown, and it has been well known in the past, that a coil formed of magnet wire inherently has voids or airspaces between conductors which are detrimental to the transfer of heat from the interstices of the coil to its surface.

For this reason, it has long been desirable to permeate electric coils with insulating material such as insulating varnish or resin which also is thermally conducting. One method of permeating a coil is to dip the coil into a solvent-type varnish or resin liquid and thereafter treat the coil with a vacuum or pressure to force the permeating liquid into the interstices of the coil. Thereafter, the permeating liquid is cured. However, this vacuum or pressure treatment does not always leave the coil void-free due to the presence of solvent in the permeating liquid and the evaporation of the solvent during the curing treatment. Applying a vacuum or pressure to the coil also adds to the expense of manufacturing the coils.

One successful method of providing an essentially void-free coil is through the use of a "wet-winding" process in which, for example, flowable solventless, adhesive, resinous material is applied to insulated magnetic wire, and then the magnet wire is wound about a form. Heat is then applied to the resulting coil to cure the adhesive resinous material to bond the turns of wire together to provide a self-supporting coil. The coil is then encapsulated with a coating of insulating material. An insulation system of this type is described and claimed in U.S. Pat. No. 3,182,383 entitled Electromagnetic Construction, which is assigned to the assignee of the present invention and is intended to be incorporated herein by reference.

The last-described process has been highly successful for use in the manufacture of a wide variety of electric coils. However, for some applications of electric coils, such as their use in two-pole dynamoelectric machines, it has been found desirable to use random-wound coils for the main field poles both to provide coils which are wound inexpensively and to provide coils which can be more readily shaped to the geometry of the frames of these machines than is possible, say, with precision-wound coils. In this particular application, the "wet-winding" process was not found to be as advantageous as might be desirable for permeating the coils with liquid varnish or resin. The random-wound coils themselves are rather loosely wound to permit later forming to the shape of the geometry of the frames and therefore little care can be taken to prevent individual lengths of magnet wire from crossing each other within the coil rather than lying parallel to one another, side by side. Thus, relatively large interstices result within the coil from the winding process, and it is difficult to ensure that these interstices are impregnated with insulation as required for efficient heat transfer.

SUMMARY OF THE INVENTION

It is an object of this invention to provide a method of manufacturing an electric coil which is inexpensively permeated with an insulating varnish or resin.

It is another object of this invention to provide a method of manufacturing an electric coil which enhances the ability of electrically insulating varnish or resin to permeate the coil while allowing the coil itself to be compacted to fit an assembly for which it is intended.

It is still another object of this invention to provide a method of manufacturing random-wound coils which both causes electric insulating varnish or resin to permeate the coils and causes the naturally occurring loose-winding of the random-wound coil to be compacted.

Briefly stated, and in accordance with one aspect of this invention, a plurality of turns of insulated magnet wire are wound about a form to make up a desired electric coil. Heat-shrinkable wrapping material, say in the form of tape with or without adhesive, is then wound about the resulting coil with openings provided in the layer of wrapping material. The taped coil may then be bent or formed if desired. Insulating liquid varnish is thereafter applied to the wrapped coil for the purpose of eventually permeating the coil. The varnished, wrapped coil is next heated to cause the wrapping material to shrink and compress the heretofore loose coil and to cause the varnish to fill the voids between adjacent turns of the coil while the varnish is being at least partially cured.

The subject matter which is regarded as this invention is particularly pointed out and distinctly claimed in the appended claims. It is believed, however, that this invention will be better understood from the following description taken in conjunction with the accompanying drawings.

DESCRIPTION OF THE PREFERRED EMBODIMENT

Figure 1:
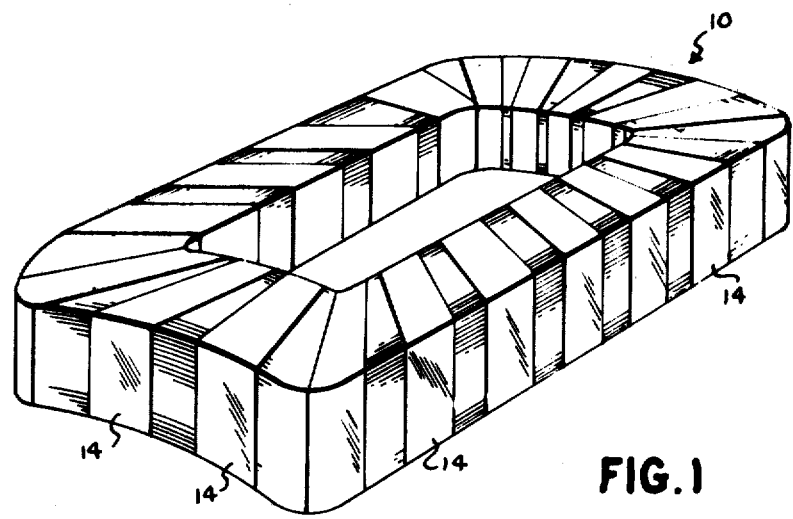
FIG. 1 is a view of an electric coil which has been wound and skip-taped in accordance with this invention.

Referring now more specifically to the drawings, FIG. 1 shows an electric coil 10 which, by way of example, is adapted for use in a dynamoelectric machine. The coil itself has been formed by random-winding insulated magnet wire about a form which has a shape and size corresponding to the shape and size of a dynamoelectric machine pole piece about which the coil will be mounted while it is in use. The number of turns in the coil is governed by design considerations of the dynamoelectric machine in which the coil is to be used. The magnet wire is typically composed of a round copper strand which is coated with an insulating material which can withstand the operating temperatures which are expected within the coil itself. One highly successful magnet wire of this type is insulated with a polyester material as is described in U.S. Pat. No. 2,936,296 which is assigned to the assignee of the present invention and is intended to be incorporated herein by reference.

After the coil has been wound about the form it is normally removed from the form and is temporarily prevented from unwinding by a few spaced turns of adhesive tape or by means of string tied around the coil. At this point the coil itself still has loosely wound turns in that none of its turns have been bound together by a permeating compound of any sort.

Thereafter, in accordance with this invention, heat-shrinkable wrapping material 14 is placed about the coil in such a manner that openings are left in the resulting layer of this wrapping material.

It is imperative that the openings in the wrapping material 14 are large enough to allow a sufficient amount of electrically insulating varnish or resin to be applied in a step to be described hereinafter. One manner of providing sufficient openings between adjacent turns of the wrapping material is by "skip-taping" the wrapping material 14 on the coil, that is by wrapping the material spirally about the coil such that space is left between adjacent turns of material. For example, in one application of this invention where the heat-shrinkable wrapping material comprised a post-oriented polyethylene terephthalate tape of the type disclosed in detail in U.S. Pat. No. 2,993,820, to Marshall which is intended to be incorporated herein by reference, this heat-shrinkable tape was about ¾ wide and a space of about one-fourth inch between adjacent turns was found to be sufficient to allow the coil to adequately absorb varnish. However, it is contemplated that those skilled in the art will provide numerous methods of leaving openings in the layer of heat-shrinkable wrapping material, such as by providing holes in the heat shrinkable material itself.

While one example of heat-shrinkable wrapping material is the polymer tape referred to as post-oriented polyethylene terephthalate above, any of the well known types of such material may be used in accordance with this invention. For example, irradiated polyethylene tape of the type described in U.S. Pat. No. 2,929,744 to Mathes et al., which is intended to be incorporated herein by reference, may be used for the purpose of this invention. A requirement is that this tape shrinks a sufficient amount when it is heated to compress the coil as required during a heating step described below.

Figure 2:
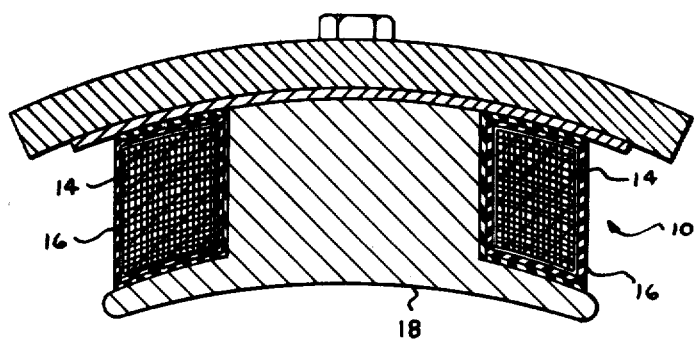
FIG. 2 is a cutaway view of an electric coil which has been insulated in accordance with this invention and is being mounted in a subassembly of a dynamoelectric machine.

The turns of the wrapped coil are now still loosely wound in that there is nothing binding the individual turns together and voids are present between the turns of the coil. At this time, the coil itself may be bent into a shape which is required for the application which is to be made of the finished coil. For example, where the coil is to be used as a field coil for a dynamoelectric machine, say for an example of the type shown in FIG. 2, it may be desirable to bend this wrapped coil at this time into a shape which approximates the shape of the frame of the machine, as shown in the drawings.

Insulating liquid varnish or resin is then applied to the wrapped coil. While this varnish may be applied in any convenient manner, as by spraying or pouring it onto the coil, in one preferred embodiment of this invention, the liquid varnish is applied by dipping the wrapped coil into a container of the varnish and allowing it to remain in the container as long as the coil is still absorbing the varnish.

While the liquid varnish or resin may comprise any "flowable" material which can be absorbed by the coil, one example of such a liquid varnish is a synthetic polyester resin of the type used as an outer layer in U.S. Pat. No. 3,414,856 issued to Guilbault and Schwenker and assigned to the assignee of this invention, this synthetic polyester resin being described as an alkyd material modified with a butylated melamine formaldehyde resin. The last cited patent is intended to be incorporated herein by reference. This synthetic polyester resin consists essentially of the product of reaction obtained by heating a mixture of:

1. From about 10.5 to 11.0 parts by weight of a saturated aliphatic polyhydric alcohol, preferably glycerine, having at least three (3) hydroxyl groups,
2. From about 10 to 20 parts by weight of fatty oil having an iodine value of at least about 100.
3. From about 17.6 to 18.8 parts by weight of isophthalic acid, and
4. From about 5 to 15 parts by weight of melamine formaldehyde resin, preferably butylated melamine formaldehyde resin.

Other known or suitable insulating 425 however, may alternatively be used, such as oleoresinous varnishes, oil-modified phenolics, styrene-modified polyester varnishes, and aklyd resins. Solventless varnishes can also be used, including polyesters, epoxies and silicones.

The coil is then heated until the insulating varnish is at least partially cured within the coil itself. As the coil is being heated, the heat shrinkable material 14 begins to shrink so that the turns of the coil which were heretofore lying loosely against one another with the liquid varnish in between them are compressed together. The insulating varnish fills the voids between the turns of magnet wire as the coil is squeezed by the heat shrinkable material 14. The insulating varnish then cures as the coil settles into its compressed condition. The coil may be heated, for example, either in a batch type oven or a conveyorized oven or in any other convenient manner.

Thereafter, the compressed coil can be insulated and protected in any desired manner, as by applying layers of insulating and protective tape 16, as described in U.S. Pat. No. 3,297,970 to Jones which is assigned to the assignee of the present invention and is intended to be incorporated herein by reference. Briefly, the exterior of the coil shown in U.S. Pat. No. 3,297,970 is protected by wrapping the cured coil with a polyester resin treated sheet and applying a layer of heat-shrinkable material such as irradiated polyethylene about the insulated coil. Various other types of insulating and protecting coverings may be applied to the compressed coil, as will be recognized by one skilled in the art.

One coil was manufactured by the method of this invention by:

a. winding a plurality of turns of insulated magnet wire about a form;
b. skip-taping a layer of post-oriented polyethylene terephthalate around the wound coil;
c. forming the taped coil in a shape required for using the coil as a main field coil for a dynamoelectric machine;
d. dipping the formed, wrapped coil in a container of butylated melamine formaldehyde resin and leaving the coil in the container for a length of time needed to allow the last-mentioned varnish to thoroughly saturate the coil and fill the interstices of the coil.
e. heating the varnish-treated coil in an oven for about 1 hour at 150° C. to cause the polyethylene terephthalate to shrink and squeeze the coil, compressing the coil and causing the varnish to fill the voids between the turns of magnet wire;
f. removing the coil from the oven after the varnish has been at least partially cured during the above heating step;
g. providing a layer of insulating material about the coil and a layer of protective material about the insulating material itself;
h. mounting the coil on a pole piece 18 in accordance with the method described in U.S. Pat. No. 3,359,631 which is assigned to the assignee of the present invention and is intended to be incorporated herein by reference.

During step h above, if the insulating varnish was partially cured in step e, the curing is completed.

One resulting insulated coil which was made in accordance with this invention was found to have been compressed by about 23 percent when compared with the condition of the treated coil was heated. Heat measurements made using well-known methods showed that the heat-transfer characteristics of the coil were highly satisfactory when compared with the heat-transfer characteristics of other coils of this type which were manufactured by accepted commercial methods known prior to this invention. It can thus be concluded that the coil has been permeated with the insulating varnish and the voids had been eliminated by the manufacturing method of this invention.

Coils manufactured in accordance with this invention were cut into sections so that the degree to which the voids between adjacent coil turns were filled could be examined visually. It was found that these voids were filled to a degree approaching very closely to 100 percent, and it is estimated that all of the coils investigated visually were at least 98 percent filled.

While this invention has been described with reference to a particular embodiment, it will be understood that numerous modifications may be made by those skilled in the art without actually departing from the scope of this invention. Therefore, it is intended that the appended claims cover the equivalent variations which come within the true spirit and scope of this invention.

What we claim as new and desire to secure by Letters Patent of the United States is:

1. A method of manufacturing an electric coil comprising the steps of:
   a. winding a plurality of turns of insulated magnet wire about a form to provide a relatively loosely wound coil;
   b. skip-taping a heat-shrinkable polymeric tape about the coil;
   c. applying an insulating liquid varnish to the wrapped coil such that the coil is permeated with the liquid varnish; and
   d. compressing the varnish-treated wrapped coil by the application of heat only to cause the heat-shrinkable wrapping material to shrink, the heretofore relatively loose turns of the coil being compressed by the shrinking wrapping material and the varnish filling voids between the turns of magnet wire and bonding the turns together as it is at least partially cured by the heat.

2. The method of manufacturing an electric coil according to claim 1 wherein the liquid varnish is applied to the coil by dipping the coil into a container of the varnish.

3. The method of manufacturing an electric coil according to claim 1 which includes the step of bending the wrapped coil into a desired shape before applying the insulating liquid varnish to the wrapped coil.

4. A method of manufacturing an electric coil according to claim 1 wherein the plurality of turns of insulated magnet wire are random-wound about the form and the heat-shrinkable material comprises a polymeric tape.

5. The method of manufacturing an electric coil comprising the steps of:
   a. winding a plurality of turns of round insulated magnet wire about a form in a random manner to provide a relatively loosely wound coil;
   b. skip-taping a heat-shrinkable polymeric tape about the coil;
   c. dipping the taped coil in a container of insulating liquid varnish; and
   d. compressing the varnish-treated, taped coil by the application of heat only to cause the tape to shrink, the heretofore relatively loose turns of the coil being compressed and the varnish filling voids between the turns of magnet wire and bonding the turns together as it is at least partially cured by the heat.

6. The method of manufacturing an electric coil according to claim 5 which also includes the step of applying an insulating, protective layer around the coil after the heating step.